Sept. 23, 1958 E. G. MALCOLM 2,853,195
VEGETABLE STRAINING SPOON
Filed March 22, 1956 2 Sheets-Sheet 1
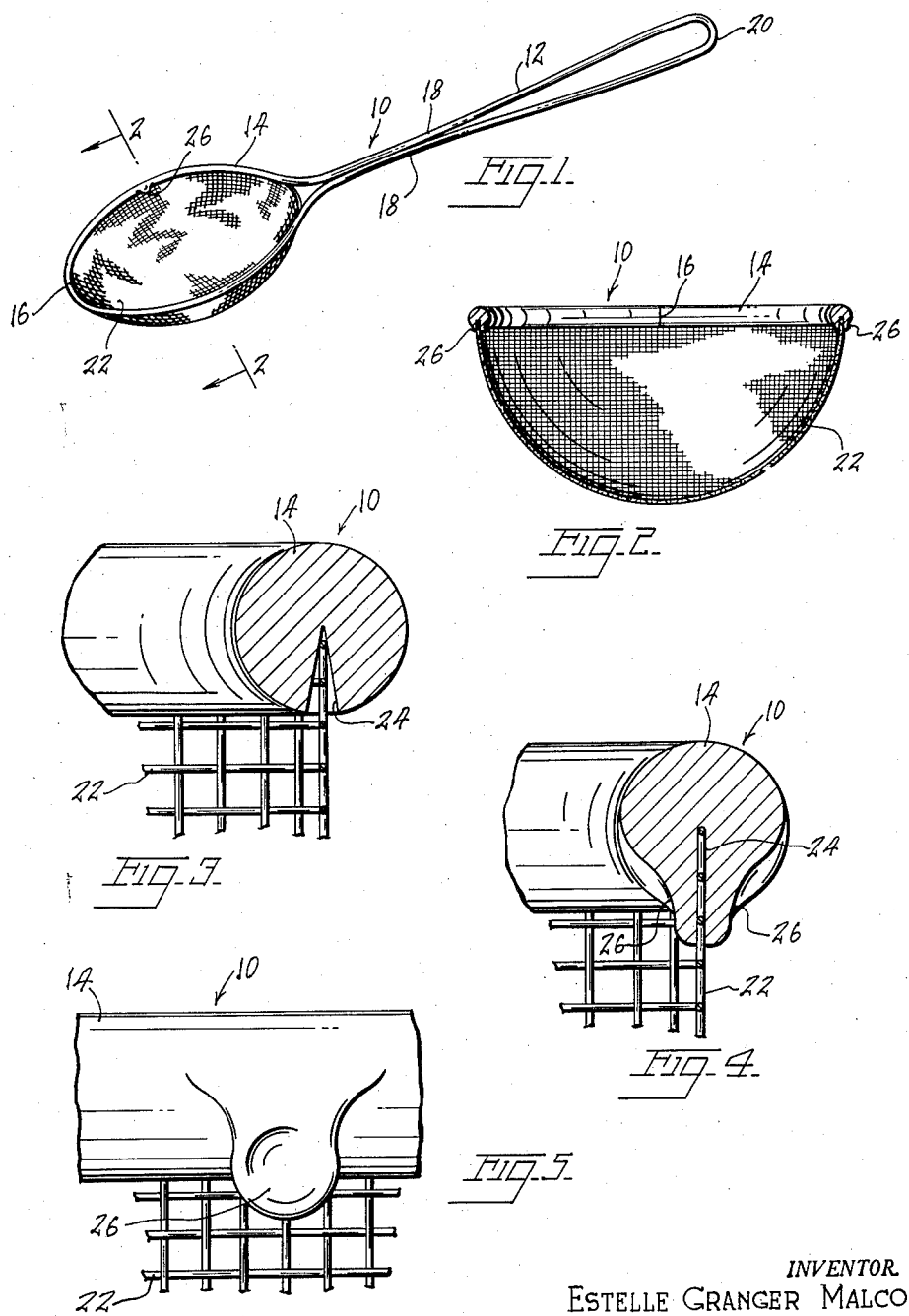
INVENTOR.
ESTELLE GRANGER MALCOLM
BY
ATTORNEY Sept. 23, 1958 E. G. MALCOLM 2,853,195
VEGETABLE STRAINING SPOON
Filed March 22, 1956 2 Sheets-Sheet 2
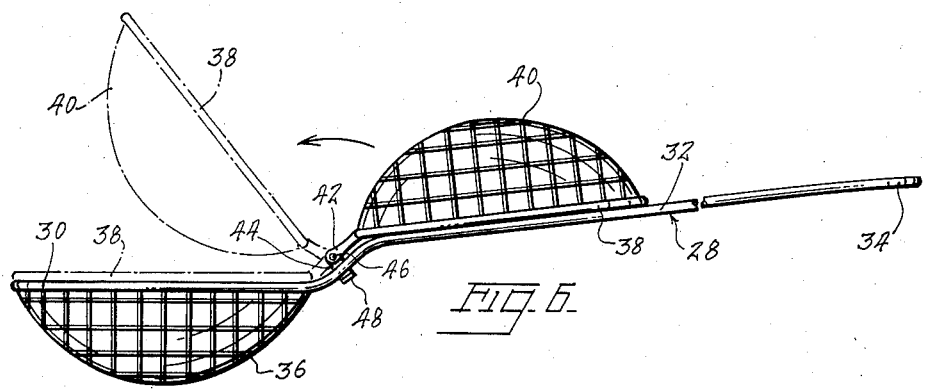
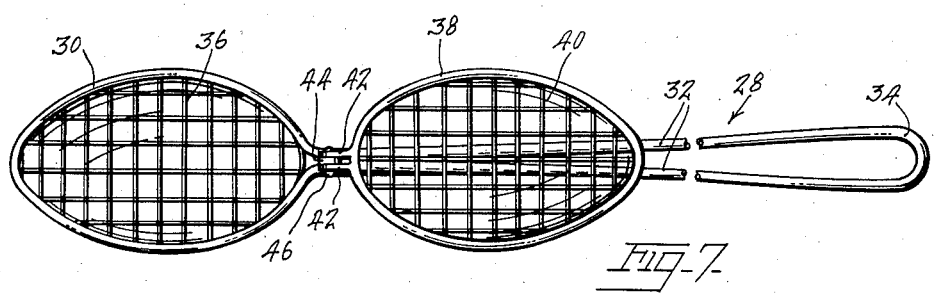
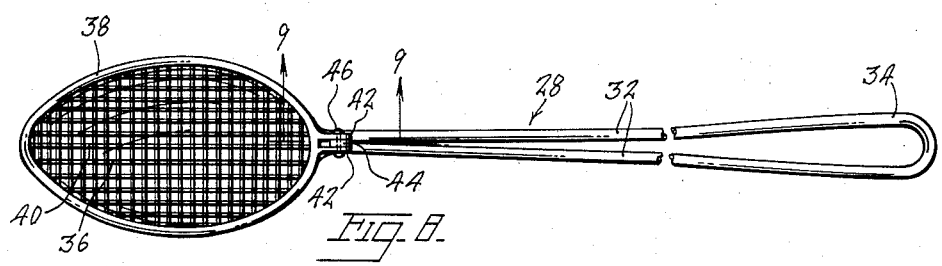
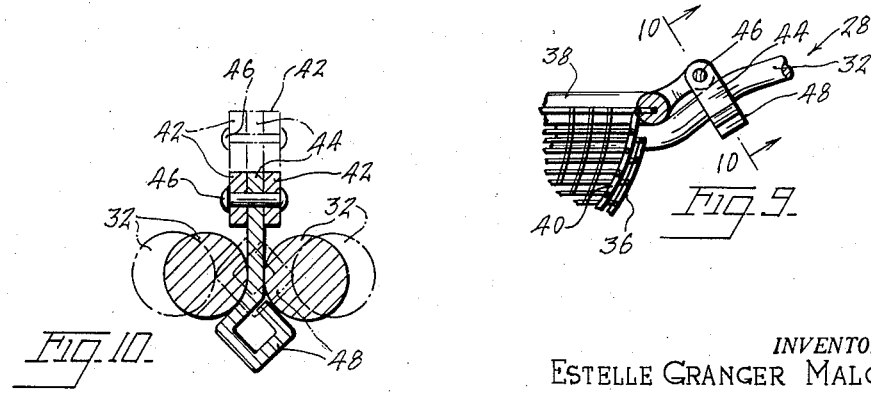
INVENTOR.
ESTELLE GRANGER MALCOLM
BY
*Golten H Polachek*
ATTORNEY

United States Patent Office 2,853,195
Patented Sept. 23, 1958

2,853,195

VEGETABLE STRAINING SPOON

Estelle Granger Malcolm, Roselle, N. J.

Application March 22, 1956, Serial No. 573,268

5 Claims. (Cl. 210—471)

This invention relates to devices for straining vegetables and, more particularly, has reference to a device of this type having appearance of and capable of being handled as a spoon, with the device having a mesh strainer extending across the bowl portion thereof.

Most usually, a spoon used for straining vegetables has a bowl portion which is formed of sheet metal or the like, and has a plurality of perforations, either circular or of slot-like shape. Such a construction, it has been found, is not wholly efficient in the straining of the vegetables, and the main object of the present invention is to provide a generally improved vegetable spoon, the bowl portion or cup of which is particularly adapted for effectively straining vegetables, due to the formation of said bowl portion from wire screen material of a suitable size of mesh.

A more specific embodiment of the invention is to so form the bowl portion that the screen member will be attached by an improved construction to a bowl frame, with said bowl frame being formed from a single length of wire material continued to provide the handle of the spoon.

Another object of importance is to provide a construction as described wherein the connection of the edge portion of the screen or strainer member to the associated wire frame will be such as to reduce to a minimum the possibility of particles lodging in the joint between the frame and strainer member.

A further object of importance is to provide, in a second form of the invention, a spoon construction wherein a first or main bowl portion, rigid with the handle, may be used alone, or alternatively, in superposed relation to an auxiliary, pivoted bowl portion swingable into and out of a nesting relationship with the main bowl portion.

Yet another object, in said second form of the invention, is to provide a staggered arrangement of the longitudinal and transverse wires forming the screens of the main and auxiliary bowl portion, so that when the auxiliary bowl portion is nested in the main bowl portion a close mesh will result, to be employed if it is considered that the more open mesh of the main bowl portion is not desirable for a particular task.

Yet another object is to so form the modified construction that the auxiliary bowl portion, when pivotally swung out of the main bowl portion, will be disposed in an out-of-the-way position in contact with the handle, to permit use of the main bowl portion alone.

Still another object, in the modified construction, is to permit the auxiliary bowl portion to be removed completely from the handle of the main bowl portion, so that there will remain a spoon similar to that of the first form of the invention, having, as in the case of the first form, a wire mesh strainer member secured to a wire frame continued on into the handle of the device.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of an improved vegetable spoon formed according to the present invention.

Fig. 2 is an enlarged transverse sectional view through the bowl of the spoon, on line 2—2 of Fig. 1.

Fig. 3 is a greatly enlarged, fragmentary, transverse sectional view on the same cutting plane as Fig. 2, showing the spoon at an intermediate stage of manufacture.

Fig. 4 is a view similar to Fig. 3 in which the connection of the strainer member to the bowl frame has been completed.

Fig. 5 is a fragmentary, greatly enlarged side elevational view of the connection between the bowl frame and strainer member, as seen from the right of Fig. 4.

Fig. 6 is a side elevational view of a modified construction, a portion of the handle being broken away, the auxiliary bowl being shown in full lines in its inoperative position and in dotted lines during adjustment to an operative position.

Fig. 7 is a top plan view of the modified construction in which the auxiliary spoon bowl is in inoperative position.

Fig. 8 is a view similar to Fig. 7 with the auxiliary spoon bowl adjusted to its operative position.

Fig. 9 is an enlarged detail sectional view on line 9—9 of Fig. 10 showing the connection of the auxiliary spoon bowl to the main part of the spoon.

Fig. 10 is a transverse sectional view, the scale being enlarged above that of Fig. 9, through the pivotal connection on line 10—10 of Fig. 9, the dotted lines showing a pivot-supporting clip as it appears when being attached to or detached from the main part of the spoon.

In Figs. 1–5, the reference numeral 10 generally designates a vegetable spoon formed according to the present invention. In accordance with the present invention, the spoon handle and bowl frame are formed from a single piece of stout wire material, suitably treated so as to be proof against corrosion. The length of wire material has its end portions bowed outwardly along curving lines in opposed relation to one another to provide a generally oval, substantially planiform bowl frame 14, the extremities of the length of wire abutting against one another at one end of the frame, at 16, as best shown in Fig. 1.

At the inner end of the bowl frame, the accurately, oppositely bowed sides of the bowl frame merge into longitudinally contacting, elongated portions 18 which, at the ends thereof remote from the bowl frame, diverge and then merge into a bight formed medially between the opposite ends of the length of wire, to provide a handle 20.

Designated at 22 is a strainer member, said strainer member being approximately oval in outer configuration, and being concaved to provide a spoon bowl in cooperation with the bowl frame 14.

Referring now to Figs. 3 and 4, there is here shown the means for connecting the edge of the strainer member to the opposite sides and outer end of the bowl frame. The sides of the bowl frame, throughout their lengths, are each formed with a continuous, longitudinally and centrally disposed slot 24 of V-shaped cross section, opening upon the underside of the frame, as shown in Fig. 3. The edges of the strainer member are inserted in the slots, during the manufacture of the device, as shown in Fig. 3, after which the opposite side portions of each side of the bowl frame are pinched inwardly as at 26, to close the slot and permanently engage the edge of the strainer member

2 therein. The respective sides of the frame can be pinched in this manner at selected locations along the length thereof, and in this manner, the strainer member is permanently assembled with the bowl frame, with the possibility of foreign particles, etc., lodging in the connection between the strainer member and bowl frame being reduced to a minimum.

In Figs. 6–10, there is shown a modified construction, generally designated at 28. This includes a length of wire material similar to that used in the first form of the invention, shaped to include a bowl frame 30 merging into a handle composed of side-by-side handle portions 32 diverging at the end of the handle remote from the bowl frame to provide a widened, open handle portion 34 similar to the portion 20 of the first form.

Thus, it will be seen that the frame part of the spoon is identical to that of the first form, and secured to the bowl frame 30 is a dished strainer member 36. This is secured at its periphery to the bowl frame in the same manner as shown in Figs. 3 and 4, but may differ from the strainer member 22 by having a coarser mesh.

In this form of the invention, there is provided an auxiliary spoon bowl including a coarse mesh strainer member 40 secured at its periphery to an oval, wire bowl frame 38. Bowl frame 38, at one end thereof, has transversely spaced ears 42 receiving between them an upwardly projecting clip 44 (Fig. 10), and extending through the upwardly projecting part of the clip and through said ears is a pivot pin 46 extending normally to the longitudinal center line of the spoon.

The clip, as shown in Fig. 10, is formed from a single piece of flat metal material, the lower end of which is rolled as at 48 to provide an enlargement upon the lower end of the clip. This enlargement, having sloped top and bottom surfaces, is inserted between the handle portions 32 by being forced downwardly, with the downwardly facing slopes of the enlargement exerting a cam action against the handle portions 32, tending to bias them apart to the dotted line positions shown in Fig. 10 to permit passage of the clip. The handle portions, it should be noted, are of a slightly springable material, so that as soon as the clip enlargement 48 has cleared the handle portions, and is in the full line position of Fig. 10, said handle portions spring back to exert a firm pressure against the opposite faces of the clip, to hold the clip frictionally against movement relative to the handle of the spoon.

It will be seen from this that the clip can be removed in its entirety from the main portion of the spoon, with upward movement of the clip being adapted to again spring the handle portions 32 apart. In this way the auxiliary spoon bowl is removed completely, and there remains a vegetable spoon similar to that shown in Fig. 1 except perhaps for having a coarser mesh strainer member.

In the use of the form of the invention shown in Figs. 6–10, and assuming that a coarse mesh strainer member is desired for a particular purpose, the auxiliary spoon bowl is pivotally swung to the full line position of Fig. 6. This permits regular use of the main spoon bowl having the strainer member 36. The auxiliary spoon bowl, being disposed against the handle, is out of the way, under these circumstances, but can be swung in the direction of the arrow shown in Fig. 6, to nesting relationship with the main spoon bowl as shown in Figs. 8 and 9.

The strainer member of the auxiliary spoon bowl may have a mesh of a coarseness equal to that of the main strainer member 36. However, the transverse and longitudinal wires forming the mesh screen of the auxiliary strainer member are offset relative to the corresponding wires of the main strainer member when the auxiliary spoon bowl and main spoon bowl are in nesting relation. Therefore, there will necessarily result a finer mesh screen or strainer member as shown in Fig. 8, to be used for straining vegetables under circumstances where a small mesh strainer member is desired.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A vegetable spoon including a length of wire material bent to include a bowl frame and a handle, and a strainer member secured at its periphery to said bowl frame to provide a vegetable-receiving bowl, said strainer member being of a wire mesh screen material, the length of wire material having oppositely, outwardly curving ends providing the sides of the bowl frame, said length of material including elongated side-by-side portions forming said handle and merging into the sides of said bowl frame, said spoon further including an auxiliary bowl carried by said handle, the auxiliary bowl being formed from a length of wire material shaped to include a bowl frame and a strainer member of wire mesh material connected at its periphery to the auxiliary bowl frame, the auxiliary bowl frame being pivoted for swinging movement toward and away from the first-named bowl frame, said auxiliary bowl being disposed in nested relationship to the first-named bowl frame when swung toward the first-named bowl frame, the pivotal mounting of the auxiliary bowl frame upon the handle including a clip removably attachable to said handle, said clip serving to hold said bowls in nested relationship.

2. A vegetable spoon including a length of springable wire material bent to include a bowl frame and a handle, and a strainer member secured at its periphery to said bowl frame to provide a vegetable-receiving bowl, said strainer member being of a wire mesh screen material, the length of wire material having oppositely, outwardly curving ends providing the sides of the bowl frame, said length of wire material including elongated side-by-side portions forming said handle and merging into the sides of said bowl frame, said spoon further including an auxiliary bowl carried by said handle, the auxiliary bowl being formed from a length of wire material shaped to include a bowl frame and a strainer member of wire mesh material connected at its periphery to the auxiliary bowl frame, the auxiliary bowl frame being pivoted for swinging movement toward and away from the first-named bowl frame, said auxiliary bowl being disposed in nested relationship to the first-named bowl frame when swung toward the first-named bowl frame, the pivotal mounting of the auxiliary bowl frame upon the handle including a clip removably attachable to said handle, said clip being formed of a piece of sheet material extending between and engaged at opposite faces thereof by said side portions of the handle, said side portions of the handle being tensioned to shift toward one another against the clip, said clip serving to hold the bowl frames in nested relationship.

3. A vegetable spoon including a length of springable wire material bent to include a bowl frame and a handle, and a strainer member secured at its periphery to said bowl frame to provide a vegetable-receiving bowl, said strainer member being of a wire mesh screen material, the length of wire material having oppositely, outwardly curving ends providing the sides of the bowl frame, said length of wire material including elongated side-by-side portions forming said handle and merging into the sides of said bowl frame, said spoon further including an auxiliary bowl carried by said handle, the auxiliary bowl being formed from a length of wire material shaped to include a bowl frame and a strainer member of wire mesh material connected at its periphery to the auxiliary bowl frame the auxiliary bowl frame being pivoted for swinging movement toward and away from the first-named bowl frame, said auxiliary bowl being disposed in nested relationship to the first-named bowl frame when swung toward the first-named bowl frame, the pivotal mounting of the auxiliary bowl frame upon the handle including a clip removably attachable to said handle, said clip being formed of a piece of sheet material extending between and engaged at opposite faces thereof by said side portions of the handle, said side portions of the handle being tensioned to shift toward one another against the clip, the clip being adapted for spreading the side portions of the handle during insertion and removal of the clip, and being adapted to hold the bowl frames in nested relationship.

4. A vegetable spoon including a length of springable wire material bent to include a bowl frame and a handle, and a strainer member secured at its periphery to said bowl frame to provide a vegetable-receiving bowl, said strainer member being of a wire mesh screen material, the length of wire material having oppositely, outwardly curving ends providing the sides of the bowl frame, said length of wire material including elongated side-by-side portions forming said handle and merging into the sides of said bowl frame, said spoon further including an auxiliary bowl carried by said handle, the auxiliary bowl being formed from a length of wire material shaped to include a bowl frame and a strainer member of wire mesh material connected at its periphery to the auxiliary bowl frame, the auxiliary bowl frame being pivoted for swinging movement toward and away from the first-named bowl frame, said auxiliary bowl being disposed in nested relationship to the first-named bowl frame when swung toward the first-named bowl frame, the pivotal mounting of the auxiliary bowl frame upon the handle including a clip removably attachable to said handle, said clip being formed of a piece of sheet material extending between and engaged at opposite faces thereof by said side portions of the handle, said side portions of the handle being tensioned to shift toward one another against the clip, the clip being adapted for spreading the side portions of the handle during insertion and removal of the clip, and including an enlargement adapted to cammingly bias the side portions of the handle away from one another during said insertion and removal, said clip serving to hold the bowl frames in nested relationship.

5. A vegetable spoon including a length of springable wire material bent to include a bowl frame and a handle, and a strainer member secured at its periphery to said bowl frame to provide a vegetable-receiving bowl, said strainer member being of a wire mesh screen material, the length of wire material having oppositely, outwardly curving ends providing the sides of the bowl frame, said length of wire material including elongated side-by-side portions forming said handle and merging into the sides of said bowl frame, said spoon further including an auxiliary bowl carried by said handle, the auxiliary bowl being formed from a length of wire material shaped to include a bowl frame and a strainer member of wire mesh material connected at its periphery to the auxiliary bowl frame, the auxiliary bowl frame being pivoted for swinging movement toward and away from the first-named bowl frame, said auxiliary bowl being disposed in nested relationship to the first-named bowl frame when swung toward the first-named bowl frame, the pivotal mounting of the auxiliary bowl frame upon the handle including a clip removably attachable to said handle, said clip being formed of a piece of sheet material extending between and engaged at opposite faces thereof by said side portions of the handle, said side portions of the handle being tensioned to shift toward one another against the clip, the clip being adapted for spreading the side portions of the handle during insertion and removal of the clip, and including an enlargement adapted to cammingly bias the side portions of the handle away from one another during said insertion and removal, said enlargement having sloped bottom surfaces and sloped top surfaces respectively engaging the handle portions during insertion and removal of the clip, said clip serving to hold the bowl frames in nested relationship.

References Cited in the file of this patent

UNITED STATES PATENTS

| | | |
|---|---|---|
| 915,055 | Hunt | Mar. 9, 1909 |
| 948,185 | Mulheir | Feb. 1, 1910 |
| 1,005,096 | Aborn | Oct. 3, 1911 |
| 1,104,773 | Bradshaw | July 28, 1914 |
| 1,110,483 | Douglas | Sept. 15, 1914 |
| 2,241,229 | Williams | May 6, 1941 |

FOREIGN PATENTS

| | | |
|---|---|---|
| 395,147 | Great Britain | July 13, 1933 |